United States Patent
Zhou et al.

(10) Patent No.: US 8,521,241 B2
(45) Date of Patent: Aug. 27, 2013

(54) SLIDING MODULE AND MOBILE TERMINAL COMPRISING THE SAME

(75) Inventors: Hu Zhou, Guangdong (CN); Ruiqiang Luo, Guangdong (CN); Xiulan Fan, Guangdong (CN); Xia Qin, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/456,972

(22) Filed: Apr. 26, 2012

(65) Prior Publication Data

US 2012/0214559 A1    Aug. 23, 2012

Related U.S. Application Data

(63) Continuation of application No. PCT/CN2010/077721, filed on Oct. 13, 2010.

(30) Foreign Application Priority Data

Oct. 29, 2009    (CN) .................. 2009 2 0206199 U

(51) Int. Cl.
*H04M 1/00* (2006.01)

(52) U.S. Cl.
USPC ............... 455/575.4; 455/90.3; 455/500.1; 455/575.1

(58) Field of Classification Search
USPC .................. 455/90.3, 500.1, 575.1, 575.4
See application file for complete search history.

(56) References Cited

U.S. PATENT DOCUMENTS

| | | | | |
|---|---|---|---|---|
| 6,799,785 B1 * | 10/2004 | Davis, Jr. | .................. | 296/37.12 |
| 2005/0255897 A1 * | 11/2005 | Lee et al. | .................. | 455/575.4 |
| 2007/0004477 A1 * | 1/2007 | Kim | .................. | 455/575.4 |
| 2007/0032278 A1 * | 2/2007 | Lee et al. | .................. | 455/575.4 |
| 2007/0123179 A1 * | 5/2007 | Lim | .................. | 455/90.3 |
| 2009/0264152 A1 * | 10/2009 | Soderlund | .................. | 455/557 |

FOREIGN PATENT DOCUMENTS

| | | |
|---|---|---|
| CN | 201590837 U | 9/2010 |
| WO | WO 2009/005238 A2 | 1/2009 |
| WO | WO 2011/050677 A1 | 5/2011 |

OTHER PUBLICATIONS

PCT International Search Report and Written Opinion mailed Jan. 20, 2011, issued in related International Application No. PCT/CN2010/077721, BYD Company Limited. (11 pages).

* cited by examiner

*Primary Examiner* — Kamran Afshar
*Assistant Examiner* — Marisol Fahnert
(74) *Attorney, Agent, or Firm* — Finnegan, Henderson, Farabow, Garrett & Dunner, L.L.P.

(57) ABSTRACT

A sliding module for a mobile terminal is provided, comprising: a support plate having a rotating mechanism on a first end thereof; a rotating plate connected with the support plate via the rotating mechanism; a sliding plate disposed on the rotating plate and configured to slide against the rotating plate; and a restricting mechanism disposed on a second end of the support plate opposite to the first end thereof to restrict a pair of first side portions at an end of the sliding plate neighboring the second end of the support plate, wherein the rotating plate may be rotated by a predetermined angle with respect to the support plate via the rotating mechanism when the first side portions slide out of the restricting mechanism. A mobile terminal comprising the same is also provided.

17 Claims, 5 Drawing Sheets

SLIDING MODULE AND MOBILE TERMINAL COMPRISING THE SAME

CROSS-REFERENCE TO RELATED APPLICATION

This patent application is a continuation of International Application No. PCT/CN2010/077721, filed Oct. 13, 2010, which claims priority to Chinese Application No. 200920206199.8, filed Oct. 29, 2009, both of which are incorporated herein by reference in their entirety.

FIELD

The present disclosure relates to mobile telecommunication, more particularly to a sliding module for a mobile terminal and a mobile terminal comprising the same.

BACKGROUND

There are mainly four kinds of mobile terminals at present, including bar phones, flip phones, slide phones and twist phones. Bar phones have a relatively large length and consequently the size of the display may be limited, which become less advantageous with the increasing popularity of multimedia applications such as images and videos. Flip phones overcome the foregoing disadvantages to a certain extent, and the angle between the keypad and the display may be well configured to be adapted to human facial configuration when the flip phone is open. However, flip phones have shortcomings such as complex operations for opening or closing the phone. Slide phones and twist phones are small in size and thus may be convenient for operation, which have the advantages of both bar and flip phones. However, the display and the keypad of slide and twist phones are positioned in the same plane when opened, which may not be well configured to be adapted to human facial configuration.

In addition, slide phones may not fit the human face well, and the microphone or the loudspeaker of the phone may be far away from the user. The slide phones may not be able to compromise between the performances of the microphone and the loudspeaker, thereby causing an inconvenient and tiring operating process for the user. Under high illumination operating conditions, such as outdoor under strong sunshine, the user has to turn his back against the sun to avoid sunshine, which may further increase operating inconvenience.

Therefore, a sliding module for a mobile terminal needs to be provided, which may be configured to fit the shape of human face well during usage.

SUMMARY

In one aspect, a sliding module for a mobile terminal is provided, which may comprise:

a support plate having a rotating mechanism on a first end thereof;

a rotating plate connected with the support plate via the rotating mechanism;

a sliding plate disposed on the rotating plate and configured to slide against the rotating plate; and a restricting mechanism disposed on a second end of the support plate opposite the first end thereof to restrict a pair of first side portions at an end of the sliding plate neighboring the second end of the support plate, wherein the rotating plate can be rotated by a predetermined angle with respect to the support plate via the rotating mechanism when the first side portions slide out of the restricting mechanism.

According to some embodiments of the present disclosure, the restricting mechanism may include a pair of side walls at the second end of the support plate with each formed with a groove facing each other. In some embodiments, the side walls may extend upwardly at the second end of the support plate. In some embodiments, the first side portions may include a pair of projecting portions from the end of the sliding plate neighboring the second end of the support plate to be mated with the grooves formed in the restricting mechanism.

According to some embodiments of the present disclosure, the rotating plate may be formed with a pair of side walls with each formed with a sliding groove, and both sides of the sliding plate may be slidably disposed in the sliding grooves of the rotating plate respectively. In some embodiments, the side walls on the rotating plate may extend upwardly.

According to some embodiments of the present disclosure, the sliding grooves may be each provided with a guide formed with a groove facing each other.

According to some embodiments of the present disclosure, the sliding plate may have a pair of second side portions. In some embodiments, the second side portion may have a stepped cross-section along a plane perpendicular to a sliding direction of the sliding plate.

According to some embodiments of the present disclosure, a slide driving structure may be provided between the sliding plate and the rotating plate. In some embodiments, the slide driving structure may be connected with the sliding plate and the rotating plate.

According to some embodiments of the present disclosure, the slide driving structure may include a spring module with a first end being rotatably connected with the sliding plate and a second end being rotatably connected with the rotating plate.

According to some embodiments of the present disclosure, the spring module may run in a free state when the sliding module is closed. In some embodiments, the spring module may be compressed maximally when the first side portions slide out of the restricting mechanism.

According to some embodiments of the present disclosure, the rotating mechanism may comprise:

a first pivot support formed on the support plate;

a second pivot support formed on the rotating plate;

a pivot shaft configured to connect the first pivot support and the second pivot support; and a rotating spring wrapped on the pivot shaft so that the rotating plate is driven to be rotated by the predetermined angle against the support plate after the sliding plate is released by the restricting mechanism.

In another aspect, a mobile terminal comprising the sliding module is provided.

With the mobile terminal comprising the sliding module as described herein, when the mobile terminal is opened, there is a predetermined angle formed between the sliding plate and the support plate, which may be well configured to be adapted to the human face. And the loudspeaker in the mobile phone may be positioned near an ear of the user whereas the microphone in the mobile phone may be positioned near the mouth of the user. It may thus be convenient to answer phone calls with a high communication quality using the mobile terminal described herein. Furthermore, the entertaining functions of audio, video or the like may be used without hand holding.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the present disclosure will become apparent and more readily appreciated from the following descriptions taken in conjunction with the drawings in which.

DETAILED DESCRIPTION OF THE EMBODIMENTS

Figure 1:
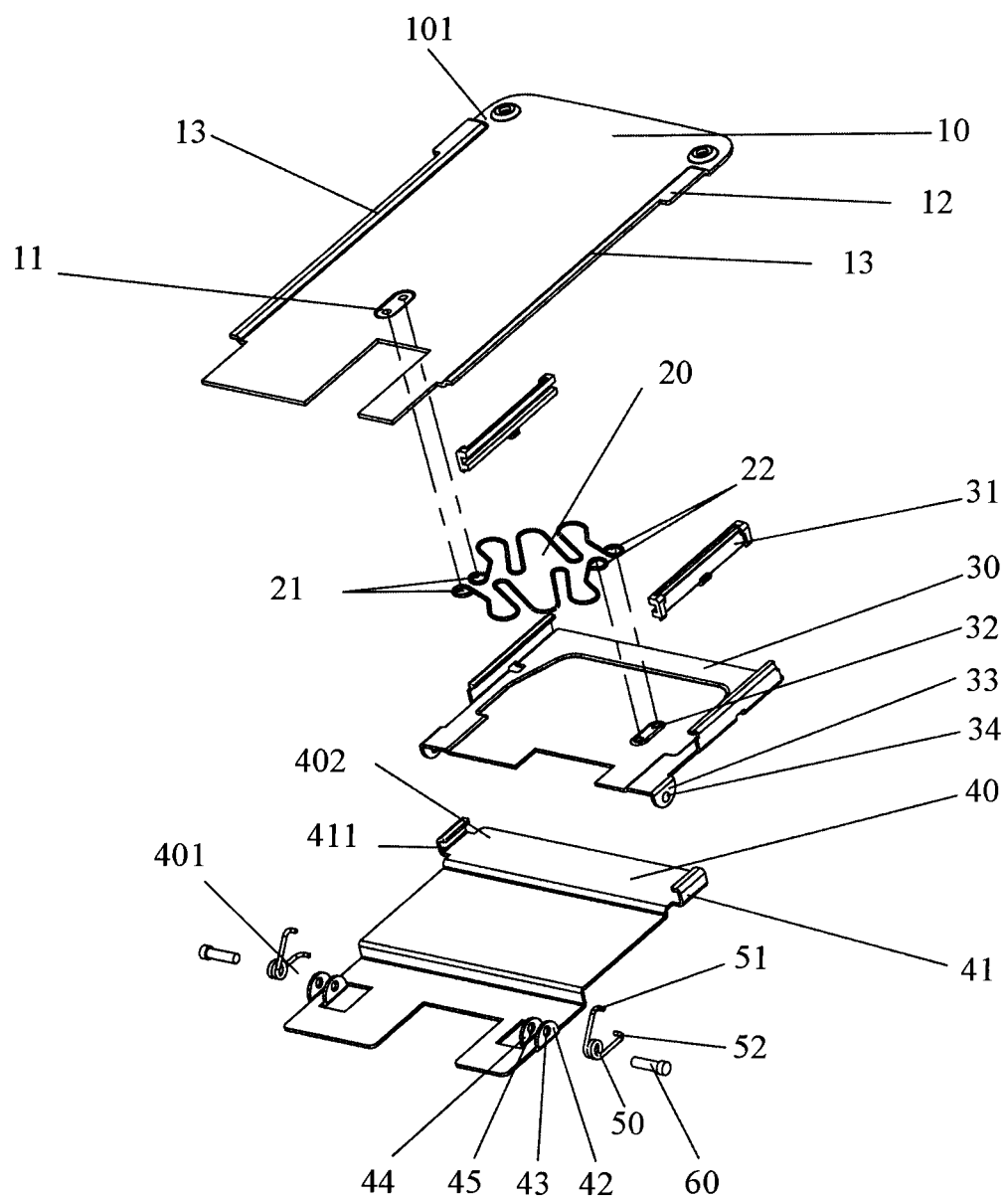
FIG. 1 is an exploded perspective view of a sliding module according to an exemplary embodiment of the present disclosure.

Reference will be made in detail to embodiments of the present disclosure. The embodiments described herein are explanatory, illustrative, and used to generally understand the present disclosure. The embodiments shall not be construed to limit the present disclosure. The same or similar elements and the elements having same or similar functions are denoted by like reference numerals throughout the descriptions.

In some embodiments, the sliding module described herein may be used for a mobile terminal, for example, but not limited to, a mobile phone, blackberry, PDA, or pager. FIG. 1 shows an exploded perspective view of a sliding module 100 according to an exemplary embodiment of the present disclosure. In some embodiments, the sliding module 100 may comprise:

a support plate 40 having a rotating mechanism on a first end 401 thereof;

a rotating plate 30 connected with the support plate 40 via the rotating mechanism;

a sliding plate 10 disposed on the rotating plate 30 and configured to slide against the rotating plate 30; and a restricting mechanism 41 disposed on a second end 402 of the support plate 40 opposite to the first end 401 thereof to restrict a pair of first side portions 12 at an end 101 of the sliding plate 10 neighboring the second end 402 of the support plate 40, wherein the rotating plate 30 can be rotated by a predetermined angle with respect to the support plate 40 via the rotating mechanism when the first side portions 12 slide out of the restricting mechanism.

In some embodiments as shown in FIG. 1, the sliding module 100 may further comprise a slide driving structure for driving the sliding plate 10. Any structure which is capable of driving the sliding plate 10 may be adopted in the slide driving structure. In some embodiments, the slide driving structure includes a spring module. In some embodiments, the slide driving structure includes a driving spring 20 as shown in FIG. 1. Thus, hereinafter, the driving spring 20 is described for illustration purpose only rather than limitation. In some embodiments, the driving spring 20 may have a first end 21 which may be connected with a first hole 11 in the sliding plate 10, and a second end portion 22 which may be connected with a second hole 32 in the rotating plate 30, for connecting the driving spring 20 with the sliding plate 10 and the rotating plate 30. The driving spring 20 may provide a driving force for the sliding plate 10 to slide against the rotating plate 30 semi-automatically. In some embodiments, the driving spring 20 may run in a free state when the sliding module 100 is closed, and the driving spring 20 may be compressed maximally when the sliding plate 10 is not restricted by the support plate 40 via the restricting mechanism, so that when the sliding plate 10 is being pushed upwards by a user, the driving spring 20 may automatically push the sliding plate 10 forwardly by the compressing force contained therein to drive the semi-automatic slide of the sliding plate 10.

Figure 2:
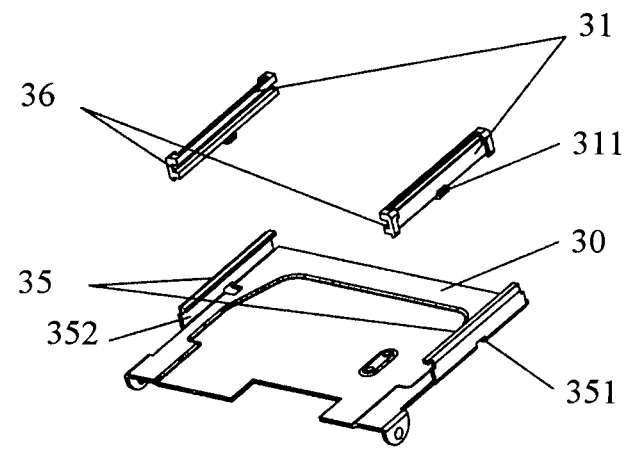
FIG. 2 is an exploded perspective view of a guide and a rotating plate according to an exemplary embodiment of the present disclosure.
Figure 3:
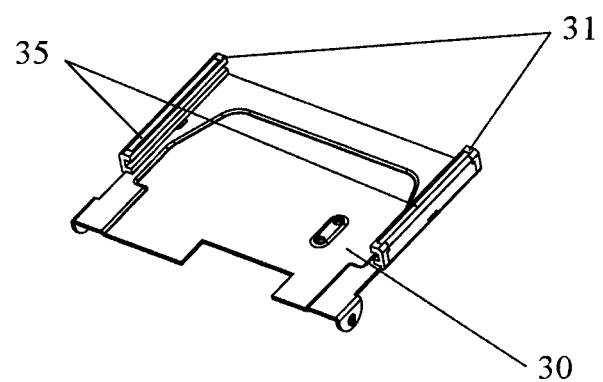
FIG. 3 is a perspective view of the guide and the rotating plate in FIG. 2 after assembly.

In some embodiments as shown in FIG. 2 and FIG. 3, the rotating plate 30 may be formed with a pair of side walls with each formed with a sliding groove 35, and both sides of the sliding plate 10 may be slidably disposed in the sliding grooves 35 of the rotating plate 30 respectively. In some embodiments, the side walls on the rotating plate 30 may extend upwardly. In some embodiments, the sliding module 100 may further comprise a pair of guides 31. In some embodiments, the guides 31 are made of plastic material. In some embodiments, the side wall of the rotating plate 30 may be formed with a recess 351 to be mated with a protrusion 311 formed on the guide 31, and thus the guide 31 may be placed into the sliding groove 35 on each sliding side wall of the rotating plate 30.

Figure 4:
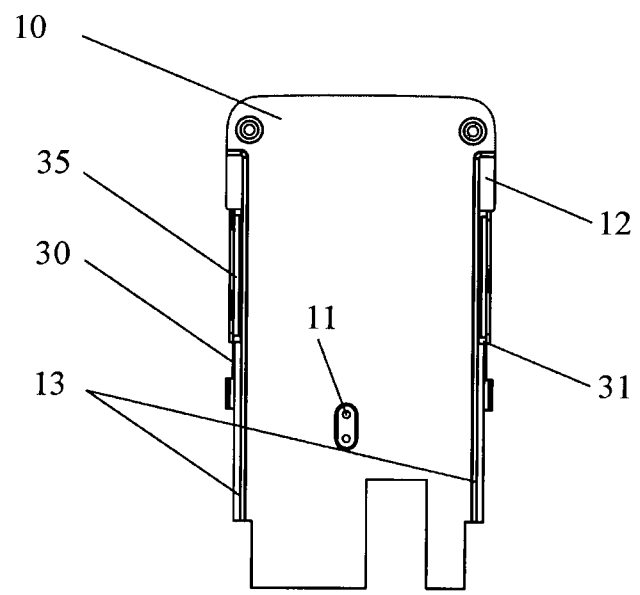
FIG. 4 is a plan view of a sliding plate and a rotating plate after assembly according to an exemplary embodiment of the present disclosure.

In some embodiments as shown in FIG. 4, the sliding plate 10 may further comprise: a pair of first side portions 12, and a pair of second side portions 13. In some embodiments, the second side portion 13 may be mated with the groove 35 formed in the guide 31 to ensure that the sliding plate 10 may slide against the rotating plate 30.

Figure 5:
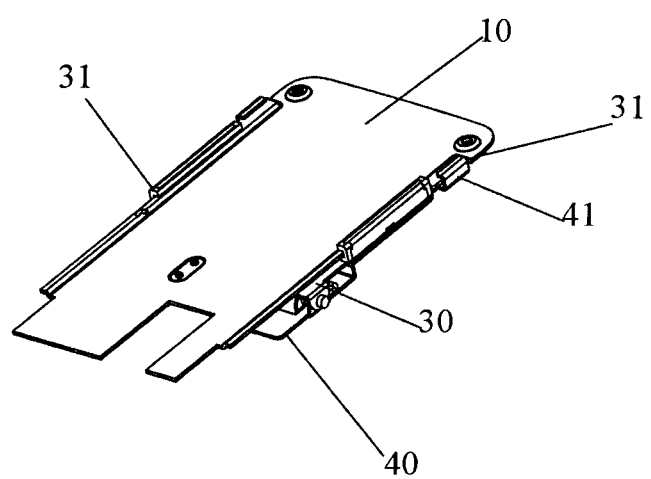
FIG. 5 is a perspective view of the sliding plate and the rotating plate in FIG. 4 after assembly.

In some embodiments as shown in FIGS. 1, 4 and 5, the rotating mechanism in the sliding module 100 may comprise:

a first pivot support 42 formed on the support plate 40;

a second pivot support 33 formed on the rotating plate 30;

a pivot shaft 60 configured to connect the first pivot support 42 and the second pivot support 33; and a rotating spring 50 wrapped on the pivot shaft 60 so that the rotating plate 30 is driven to be rotated by the predetermined angle against the support plate 40 after the sliding plate 10 is released from the restricting mechanism 41.

In some embodiments as shown in FIG. 1, an upper end 51 of the rotating spring 50 may be connected with the rotating plate 30, and a lower end 52 of the rotating spring 50 may be connected with the support plate 40. In some embodiments, when the rotating plate 30 and the support plate 40 are connected through the rotating mechanism, the rotating spring 50 may be compressed by the rotating plate 30 and the support plate 40. And the rotating plate 30 may be thus driven to rotate by a predetermined angle with respect to the support plate 40 after the sliding plate 10 is released from the restricting mechanism 41.

According to some embodiments of the present disclosure, the driving spring 20 may be a spring or a spring module for a conventional sliding module. In some embodiments, the rotating spring 50 may be a torsion spring. In some embodiments, the rotating spring 50 may be fixed between the rotating plate 30 and the support plate 40 by the pivot shaft 60. A suitable torsion spring may provide enough twisting forces to rotate the rotating plate 30 by the predetermined angle with respect to the support plate 40. Different angles between the sliding plate 10 and the support plate 40 when the sliding module 100 is open, may be adjusted by using torsion springs with different elastic modulus.

According to some embodiments of the present disclosure, the restricting mechanism 41 may include a pair of side walls at the second end 402 of the support plate 40 with each being formed with a groove 411 facing each other. In some embodiments, the side walls may extend upwardly at the second end 402 of the support plate.

In some embodiments, when the sliding module 100 is closed, the first side portion 12 on the sliding plate 10 may be located in the restricting mechanism 41 on the support plate 40. In some embodiments, the first side portion 12 may be configured to be mated or engaged with the restricting mechanism 41 so that the sliding plate 10 may move along the guides 31 before the first side portions 12 on the sliding plate 10 slide out of the restricting mechanism 41, thereby restraining the sliding direction of the sliding module 100.

In some embodiments, when the sliding module 100 is closed, the rotating spring 50 may be compressed between the rotating plate 30 and the support plate 40, and thus the rotating plate 30 may have a tendency to rotate with respect to the support plate 40, which is prevented by the first side portions 12 on the sliding plate 10 being engaged in the restricting mechanism 41 on the support plate 40. As the sliding module 100 is being pushed upwards, the driving spring 20 may be compressed accordingly. When the first side portions 12 on the sliding plate 10 just move out of the restricting mechanism 41 on the support plate 40, the sliding plate 10 may no longer be restricted by the support plate 40, and may rotate with the rotating plate 30 with respect to the support plate 40 driven by the compressed rotating spring 50. At the same time, the sliding plate 10 may move with respect to the rotating plate 30 along the guides 31, under the driving force of the driving spring 20. In this way, the curving motion of the sliding plate 10 relative to the support plate 40 may be realized, and the predetermined angle between the sliding plate 10 and the support plate 40 may be formed when the sliding module 100 is opened. Operations of the sliding module 100 will be described in detail as follows.

Figure 6:
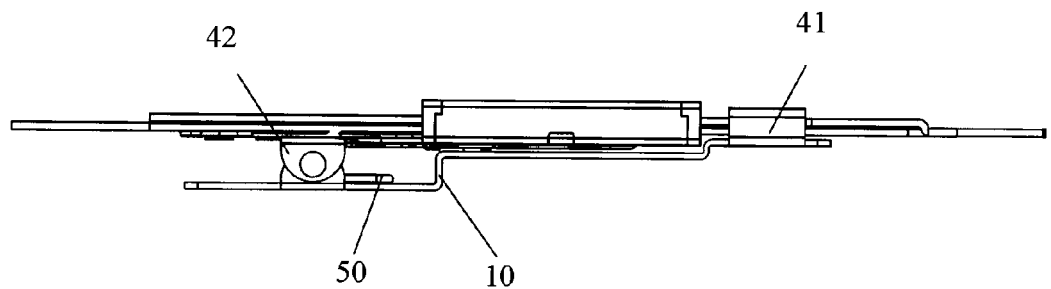
FIG. 6 is a side view of the sliding plate and the rotating plate in FIG. 4 after assembly.

In some embodiments as shown in FIGS. 5 and 6, when the sliding module 100 is closed, the driving spring 20 may be in a free state, and the sliding plate 10 may be restricted on the rotating plate 30. At the same time, the rotating spring 50 may be compressed between the rotating plate 30 and the support plate 40, and thus the rotating plate 30 may have a tendency to rotate with respect to the support plate 40, which is prevented by the first side portions 12 on the sliding plate 10 being engaged in the restricting mechanism 41 on the support plate 40. Therefore, the rotation of the rotating plate 30 relative to the support plate 40 may be prevented.

Figure 7:
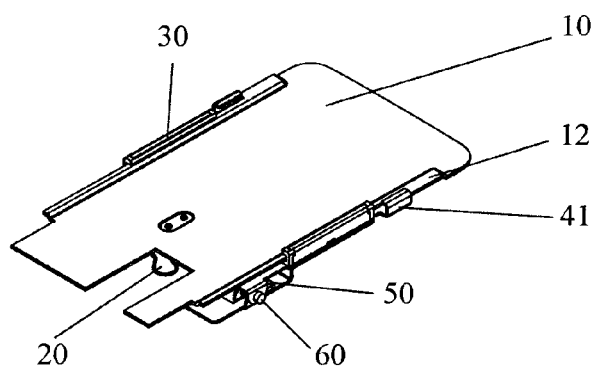
FIG. 7 is a perspective view showing an intermediate state during opening of a sliding module according to an exemplary embodiment of the present disclosure.

As the sliding plate 10 is moved further upwards, the driving spring 20 may be compressed to provide a driving force between the sliding plate 10 and the rotating plate 30. As shown in FIG. 7, when the sliding plate 10 is moved against the rotating plate 30 with the first hole 11 being registered with the second hole 32, the first side portions 12 on the sliding plate 10 may move out of the restricting mechanism 41 on the support plate 40, so that the rotating plate 30 may no longer be restricted by the support plate 40. At this time, the rotating spring 50 may be compressed maximally.

At the same time, the rotating spring 50 in the compressed state may provide a twisting force for the rotating plate 30 to rotate with the sliding plate 10 against the support plate 40.

Figure 8:
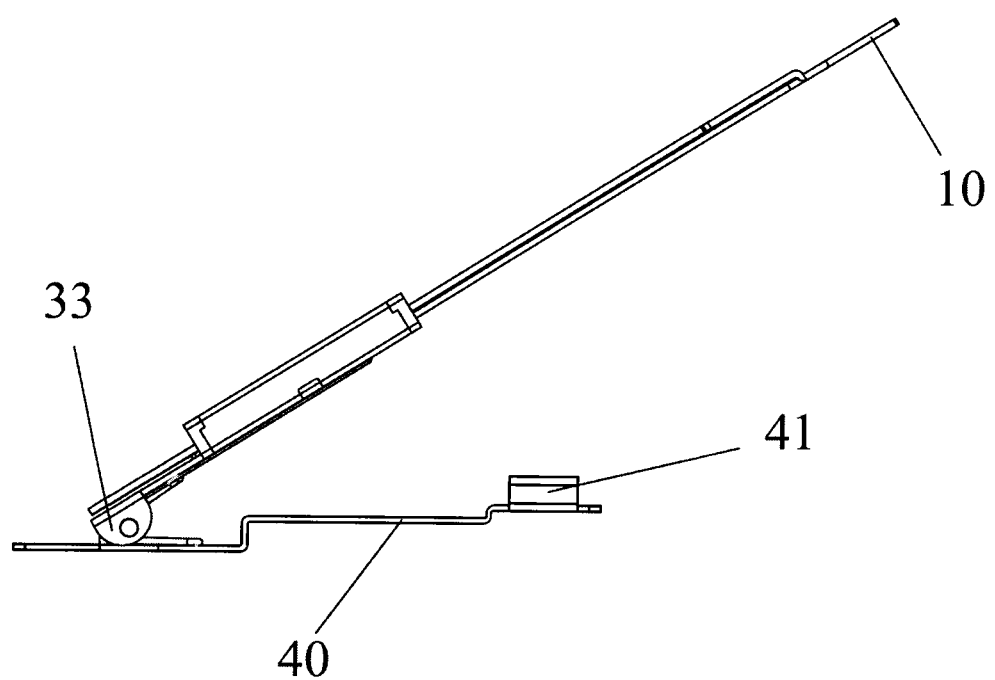
FIG. 8 is a side view of a sliding module after opening according to an exemplary embodiment of the present disclosure.

Then, when the sliding plate 10 is being pushed a little further, the sliding plate 10 may be moved along the guide 31 under the compressing force of the driving spring 20. At the end, the sliding module 100 is opened with the predetermined angle between the sliding plate 10 and the support plate 40, as shown in FIG. 8. Therefore, the sliding module 100 may form the predetermined angle which may be configured to be well adapted to human face during usage.

When the sliding plate 10 is pushed downward, the sliding plate 10 may rotate with the rotating plate 30 toward the support plate 40, and the rotating spring 50 may be compressed accordingly. When the rotating plate 30 is parallel to the support plate 40, the sliding plate 10 may be pushed back, and the driving spring 20 may be compressed so as to provide a driving force between the sliding plate 10 and the rotating plate 30. When the first side portions 12 on the sliding plate 10 slide to the middle of the restricting mechanism 41 on the support plate 40, the first side portions 12 on the sliding plate 10 may engage in the restricting mechanism 41 on the support plate 40, so that the rotating plate 30 may be confined by the support plate 40 and consequently unable to rotate. The sliding plate 10 may continue to move back along the guide 31 under the driving force of the driving spring 20 until the driving spring 20 returns to its free state, and then the sliding module 100 is closed accordingly.

Further, a mobile terminal comprising the sliding module 100 may be provided. In some embodiments, an upper part of the mobile terminal may be connected with the sliding plate 10 while a lower part of the mobile terminal may be connected with the support plate 40. During the opening of the mobile terminal, the upper part of the mobile terminal may first move linearly and then accomplish a curving motion with a combination of linear movement and rotation, which may provide a visual impact to the users.

With the mobile terminal described herein, an angle between the sliding plate 10 and the support plate 40 is formed when the mobile terminal is opened, which may be configured to be well adapted to the human face with the loudspeaker being positioned adjacent to the ear and the microphone being positioned near the mouth. And it is convenient to pickup phone calls with a high communication quality. Furthermore, the entertaining functions of audio, video or the like may be used without hand holding.

Although the present disclosure have been described in detail with reference to several embodiments, additional variations and modifications exist within the scope and spirit as described and defined in the following claims.

What is claimed is:

1. A sliding module for a mobile terminal, comprising:
   a support plate comprising a rotating mechanism on a first end thereof;
   a rotating plate connected with the support plate via the rotating mechanism;
   a sliding plate disposed on the rotating plate and configured to slide against the rotating plate; and
   a restricting mechanism disposed on a second end of the support plate opposite to the first end thereof to restrict a pair of first side portions at an end of the sliding plate neighboring the second end of the support plate,
   wherein the rotating plate is rotated by a predetermined angle with respect to the support plate via the rotating mechanism when the first side portions slide out of the restricting mechanism,
   the restricting mechanism comprises a pair of side walls at the second end of the support plate with each being formed with a groove facing each other, and the first side portions comprise a pair of projecting portions from the end of the sliding plate neighboring the second end of the support plate to be mated with the grooves formed in the restricting mechanism.

2. The sliding module according to claim 1, wherein the rotating plate is formed with a pair of side walls with each formed with a sliding groove, and both sides of the sliding plate are slidably disposed in the sliding grooves of the rotating plate respectively.

3. The sliding module according to claim 2, wherein the sliding grooves are each provided with a guide formed with a groove facing each other.

4. The sliding module according to claim 3, wherein the side wall of the rotating plate is formed with a recess to be mated with a protrusion formed on the guide.

5. The sliding module according to claim 2, wherein the sliding plate comprises a pair of second side portions.

6. The sliding module according to claim 5, wherein the second side portion of the sliding plate has a stepped cross-section along a plane perpendicular to a sliding direction of the sliding plate.

7. The sliding module according to claim 5, wherein the second side portion is mated with the groove formed in the guide.

8. The sliding module according to claim 1, further comprising a slide driving structure provided between the sliding plate and the rotating plate for driving the sliding plate to slide.

9. The sliding module according to claim 8, wherein the slide driving structure is connected with the sliding plate and the rotating plate.

10. The sliding module according to claim 8, wherein the slide driving structure comprises a spring module with a first end rotatably connected with the sliding plate and a second end rotatably connected with the rotating plate.

11. The sliding module according to claim 10, wherein the first end of the spring module is rotatably connected with a first hole on the sliding plate, and the second end of the spring module is rotatably connected with a second hole on the rotating plate.

12. The sliding module according to claim 10, wherein
the spring module runs in a free state when the sliding module is closed; and
the spring module is compressed maximally when the first side portions slide out of the restricting mechanism.

13. The sliding module according to claim 1, wherein the rotating mechanism comprises:
a first pivot support formed on the support plate;
a second pivot support formed on the rotating plate;
a pivot shaft configured to connect the first pivot support and the second pivot support; and
a rotating spring wrapped on the pivot shaft so that the rotating plate is driven to be rotated by the predetermined angle against the support plate after the sliding plate is released by the restricting mechanism.

14. The sliding module according to claim 13, wherein the rotating spring is a torsion spring.

15. The sliding module according to claim 13, wherein an upper end of the rotating spring is connected with the rotating plate, and a lower end of the rotating spring is connected with the support plate.

16. The sliding module according to claim 13, wherein the rotating spring is fixed between the rotating plate and the support plate by the pivot shaft.

17. A mobile terminal comprising the sliding module according to claim 1.

* * * * *